(12) United States Patent
Weissert et al.

(10) Patent No.: US 7,118,123 B2
(45) Date of Patent: Oct. 10, 2006

(54) DYNAMIC/CONTROLLED TETHER ARRANGEMENT FOR AN AIRBAG DOOR

(75) Inventors: Ulrich Weissert, Rochester, MI (US); Keith A. Riha, Rochester, MI (US)

(73) Assignee: Collins & Aikman, Southfield, MI (US)

( * ) Notice: Subject to any disclaimer, the term of this patent is extended or adjusted under 35 U.S.C. 154(b) by 0 days.

(21) Appl. No.: 10/951,447

(22) Filed: Sep. 28, 2004

(65) Prior Publication Data

US 2005/0127642 A1    Jun. 16, 2005

Related U.S. Application Data

(63) Continuation of application No. PCT/US03/09650, filed on Mar. 28, 2003.

(60) Provisional application No. 60/368,418, filed on Mar. 28, 2002.

(51) Int. Cl.
B60R 21/20    (2006.01)
(52) U.S. Cl. .................................................. 280/728.3
(58) Field of Classification Search ............ 280/743.2, 280/728.3
See application file for complete search history.

(56) References Cited

U.S. PATENT DOCUMENTS

| | | | |
|---|---|---|---|
| 5,211,421 A | 5/1993 | Catron et al. ............... 280/728 |
| 5,308,106 A | 5/1994 | Heidorn ................... 280/728 B |
| 5,332,257 A | 7/1994 | Rogers et al. .......... 280/728 B |
| 5,460,401 A * | 10/1995 | Gans et al. .............. 280/728.3 |
| 5,533,746 A | 7/1996 | Whited ..................... 280/728.2 |
| 5,564,731 A | 10/1996 | Gallagher et al. ....... 280/728.3 |
| 5,685,930 A | 11/1997 | Gallagher et al. ......... 156/73.1 |
| 5,765,862 A | 6/1998 | Bentley .................... 280/728.3 |
| 5,804,121 A | 9/1998 | Gallagher .................... 264/250 |
| 5,902,428 A | 5/1999 | Gallagher et al. ......... 156/73.1 |
| 5,941,558 A | 8/1999 | Labrie et al. ............ 280/728.3 |
| 5,975,563 A | 11/1999 | Gallagher et al. ....... 280/728.3 |
| 6,203,056 B1 | 3/2001 | Labrie et al. ............ 280/728.3 |
| 6,435,554 B1 * | 8/2002 | Feldman .................. 280/743.2 |
| 6,644,685 B1 * | 11/2003 | Sun et al. ................ 280/728.3 |

* cited by examiner

*Primary Examiner*—Faye M. Fleming
(74) *Attorney, Agent, or Firm*—Grossman, Tucker, Perreault & Pfleger, PLLC

(57) ABSTRACT

An airbag door construction for airbag deployment comprising an instrument panel having an area outlining at least a portion of an airbag door. A reaction plate is attached to the underside of the panel at the airbag door location. The reaction plate contains first and second molded features, each such feature having a flexural strength ($F_s$), wherein the first molded feature's $F_s$ is lower than the second molded feature's $F_s$. A tether is included that engages with the molded features in the reaction plate whereupon airbag deployment the tether is not retained by the first molded feature but is retained by the second molded feature

14 Claims, 5 Drawing Sheets

DYNAMIC/CONTROLLED TETHER ARRANGEMENT FOR AN AIRBAG DOOR

CROSS REFERENCE TO RELATED APPLICATIONS

This application is a continuation of International Application No. PCT/US03/09650 filed Mar. 28, 2003 and published Oct. 9, 2003 as International Publication No. WO 03/082635, designating the United States, and which claims benefit of U.S. Provisional Application No. 60/368,418 filed Mar. 28, 2002.

FIELD OF THE INVENTION

The present invention relates to airbag door constructions for vehicles and, more particularly, to hinging and retention of the door through the use of a dynamic tether design that controllably tensions upon airbag deployment.

BACKGROUND OF THE INVENTION

Nearly all motor vehicles today are provided with inflatable restraint systems to protect both the driver and passengers in the event of a collision. The airbag system for the passenger side of the vehicle generally includes an inflator and reaction canister located behind the instrument panel and the airbag inflates through an opening in the panel. That opening may be covered by a rectangular shaped door that is flush mounted in the opening and is moved out of the way on a hinge or tethers by the deploying airbag. In some applications, the door that covers the opening may be "invisible" to the occupants of the vehicle, that is, hidden behind a surface covering of skin and foam which is pre-weakened by a groove formed on the backside of the skin layer to allow a predictable tearing of the skin. A separate door substrate is hinged or tethered to the instrument panel or canister to control door opening.

Vehicles such as small trucks, SUV's and small to medium sized cars often will use a hard panel construction, without a separate soft skin and padded foam layer, to reduce cost. In these cases, a separate airbag door, instrument panel and door chute are assembled over the canister. To control the path of the airbag as it expands, a deployment chute transitions the space between the canister where the bag is stored and the back of the airbag door to assure that the bag does not expand in an undesirable direction. Use of a hard door separate from the remainder of the instrument panel may allow replacement of only the door portion after a low speed deployment, as the remainder of the instrument panel may not be damaged. In still other applications, the hard instrument panel may be of unitary construction with a pre-weakened seam of reduced cross-section formed on the underside of the panel, outlining the periphery of the airbag door. Hinges, tethers, reinforcements and chutes are then post-attached to the molded hard panel.

Additionally, it is known in the art to use both hinges and tethers to control the opening and travel of the door or door substrate. In U.S. Pat. Nos. 5,685,930; 5,564,731; 5,804,121; 5,902,428 and 5,975,563 to Gallagher, et al and commonly assigned to the assignee of the present invention and included herein by reference, a molded motor vehicle instrument panel made of thermoplastic material having an integral airbag deployment door for a passenger side airbag that is defined by a tear seam and normally retained by an integral flexible mounting/hinge flange is disclosed.

In U.S. Pat. Nos. 5,685,930 and 5,902,428 the door is retained by a supplemental tethering hinge which is formed separately from the panel and attached by welding or an adhesive. The supplemental tethering hinge contains a loop or fold 63 as slack to let the door separate and move controllably away from the instrument panel to allow the bag to expand through the opening.

In U.S. Pat. Nos. 5,564,731 and 5,975,563 the flexible tethering hinge is described as being of sheet material, thermosetting, thermoplastic, metal mesh or woven fabric of plastic or natural fibers and attached by mechanical fasteners or hot staked bosses on the inner side of the door portion.

U.S. Pat. Nos. 5,975,563 and 5,804,121 are directed at an integral mounting hinge/flange on which is formed a bonded layer of second plastic material on one side of the flange and on the inner side of a potentially frangible portion of the door. The second plastic material has the physical characteristic of remaining ductile at low temperatures at which the instrument panel plastic material becomes brittle and as a result, the bonded layer forms a tether to retain the door in a controllable manner as it separates from the instrument panel when the airbag is deployed.

In U.S. Pat. No. 5,765,862 to Autoliv ASP, Inc., an inflatable airbag assembly mounted in a rectangular opening in the vehicle instrument panel is disclosed having bracket means, a plurality of thermoplastic resin fasteners and an integrally formed tether support bar 18 for a tether 20 that is connected between the door 14 and a bracket 22, on the airbag module 16.

U.S. Pat. No. 5,533,746 to Morton International recites "a cover for covering an opening in a panel adjacent to an airbag inflation system comprising: . . . a tether attachment element having a first portion sandwiched between said inner (metal) and outer substrates and second portion exposed for attachment to a tether and at least one tether having a loop at an outer end portion of said tether attachment element and having an inner end portion adapted for fixed attachment to limit the amount of movement of said cover away from the opening deployment of the airbag inflation system". Col. 9, Ln. 17–25. The tether may comprise a loop and the attachment element may be an elongated metal rod. The attachment element (rod) has a series of U-shapes that extend from between the door inner and outer back to a flexible tether that is looped in its undeployed condition.

U.S. Pat. No. 5,332,257, also to Morton International, discloses a tether having first and second ends, the first end being secured to said module cover (on the B-side), and the second end forming a loop, a retainer rod extending through said loop and a channel enclosing said retainer rod and loop in a fixed position . . . to anchor said tether.

U.S. Pat. No. 5,211,421 to G.M., discloses a tether that is on the A-side of an airbag door, between substrate and foam layer which is fastened to a bracket on the canister.

All of these references use numerous components in an attempt to accomplish their objectives resulting in added material and manufacturing costs. Separate door, chute, tether, fastener and reinforcement materials are combined with a myriad of attachment processes to form an assembly that must be installed in the instrument panel.

It is therefore an object of the invention to provide a tether for an airbag door that has a controlled slack such that the slack tensions, in a controlled and dynamic manner, to retain the door to the instrument panel upon airbag deployment.

More specifically, it is a further object to provide a tether for an airbag door that is secured to the airbag door and wherein the tether shape within the door is defined by engagement to a series of ribs in the door and which tether shape ultimately defines a tether slack that is controllably tensioned upon airbag deployment.

These and other objects, advantages and features of the present invention will become more apparent from the following description and the accompanying drawings.

SUMMARY OF THE INVENTION

An airbag cover for an instrument panel for use in airbag deployment comprising a tether engaged with said cover, said cover including molded features wherein said tether follows a path created by said molded features, a portion of said features being deflected by said tether upon airbag deployment.

In a second embodiment, the present invention comprises an airbag door construction for airbag deployment comprising an instrument panel having an area outlining at least a portion of an airbag door, a reaction plate and deployment chute attached to the underside of said airbag door and said instrument panel at said airbag door location, wherein at least one of said airbag door underside and said reaction plate contain first and second molded features, each such feature having a flexural strength ($F_s$), wherein said first molded feature's $F_s$ is lower than said second molded feature's $F_s$, and a tether that engages with said molded features in said reaction plate whereupon airbag deployment said tether is not retained by said first molded feature but is retained by said second molded feature.

DETAILED DESCRIPTION OF THE PREFERRED EMBODIMENTS

Figure 1:
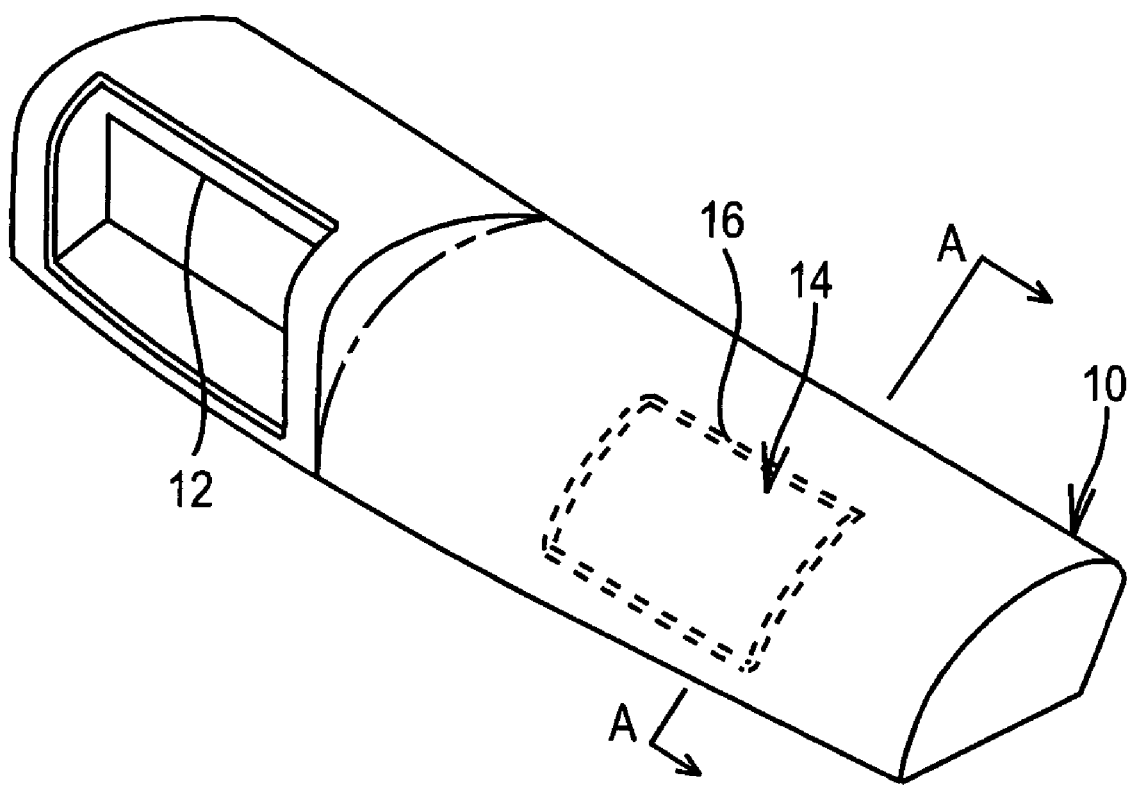
FIG. 1 is a perspective view of a motor vehicle instrument panel including an airbag deployment door with a tether according to the present invention as installed in a motor vehicle over an airbag system.

The present invention addresses the deficiencies of the prior art by providing a tether for an airbag door that can be described as being trapped between the airbag door substrate and a reaction/close-out plate. The tether preferably has a loop of slack the shape of which is controlled by a series of ribs between the back of the airbag door and the front of the reaction plate. Some ribs are rigid to control the tether, others are deflectable such that the tether can move by them, and eliminate the slack in the loop as the cable straightens out during airbag deployment. More specifically, upon airbag deployment, the shape of the cable is straightened out as the airbag door pulls the cable, moving the deflectable shaping ribs out of the way. The ends of the cable are then preferably caught between the deployment chute and the instrument panel substrate or are connected to each other.

The tethers are preferably made from any material suitable to function as a tether, such as metal in the form of wire, cable or formed rods, but may be of other fiber or woven materials. End features are provided to the tether to prevent the tether ends from breaking loose.

Turing to a description of the invention in connection with the figures, for elements common to the various embodiments of the invention, the numerical reference character between the embodiments is held constant, but distinguished by the addition of an alphanumeric character to the existing numerical reference character. In other words an element referenced at 10 in the first embodiment is correspondingly referenced at 10A, 10B, and so forth in subsequent embodiments. Thus, where an embodiment description uses a reference character to refer to an element, the reference character applies equally, as distinguished by alphanumeric character, to the other embodiment where the element is common.

Figure 4:
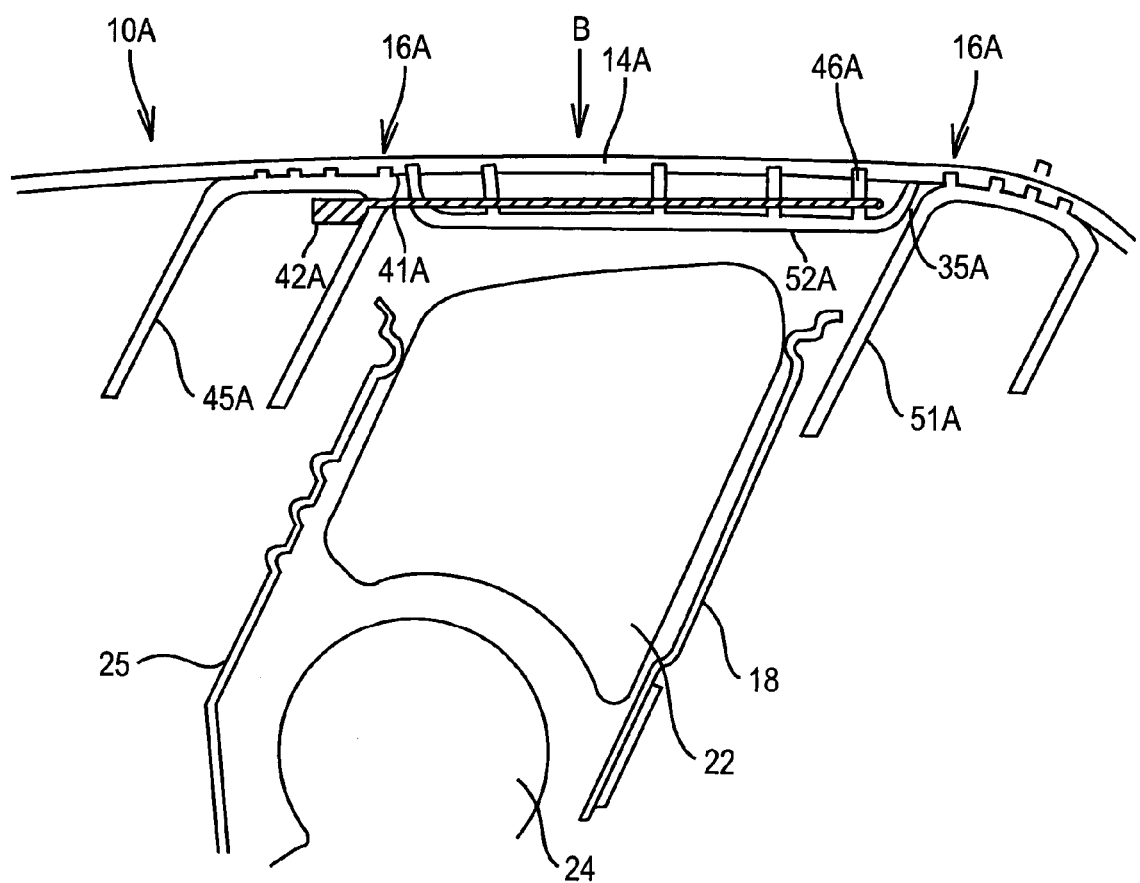
FIG. 4 is an enlarged view of an alternate instrument panel construction taken along line A—A of FIG. 1 when looking in the direction of the arrows.

Referring to FIG. 1 there is illustrated a molded motor vehicle instrument panel 10 as installed in a motor vehicle structure. The instrument panel 10 has an opening 12 on the driver side for the installation of an instrument cluster (not shown) and an airbag deployment door 14 of desired shape, in this case rectangular, on the passenger side whose entire or partial perimeter, in this case entire, is defined by a frangible tear seam 16 in the instrument panel. The tear seam 16 may be formed by a groove either in the face of the panel as shown in FIG. 1 or by a similar groove in the back side of the panel as shown in FIG. 4 to hide the tear seam from view as is well known in the art or by other methods known in the art of forming an integral but frangible tear seam. As shown in FIG. 4, when installed on the vehicle structure, the instrument panel covers an airbag system 18 that is located behind the instrument panel directly behind the airbag door 14A and is mounted on a sheet metal portion (not shown) of the vehicle structure. The airbag system 18 is of a conventional type that includes an inflatable airbag 22, an inflator 24, canister 25, and an impact sensor (not shown) that on vehicle impact triggers ignition of the inflator to inflate the airbag for deployment into the passenger space directly in front of a passenger seated on this side.

Figure 2:
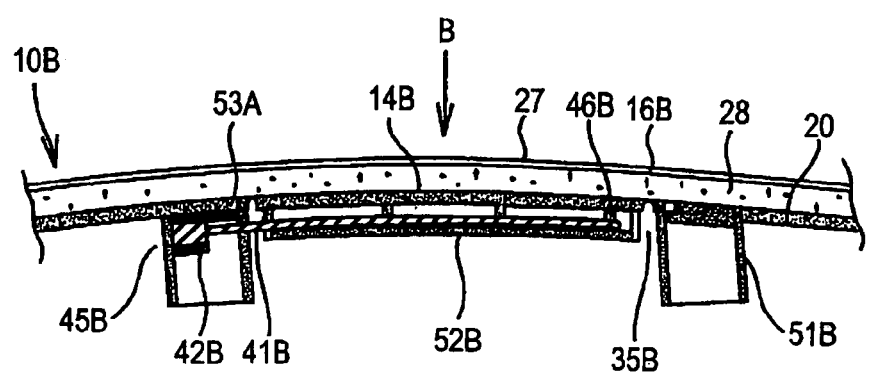
FIG. 2 is an enlarged view taken along line A—A of FIG. 1 when looking in the direction of the arrows and includes a diagrammatic view of the airbag system.

FIG. 2 shows a cross-sectional view of a padded instrument panel with an invisible airbag door taken along line A—A of FIG. 1 looking in the direction of the arrows. In this embodiment of the invention, an instrument panel substrate 10B has been molded of thermoplastic resin and has been covered with a flexible skin 27 and foam layer 28. A pre-weakened tear seam 16B is formed or cut in the underside of the skin to define the airbag door 14B and the opening that will be created for the airbag to pass through upon deployment.

Figure 3:
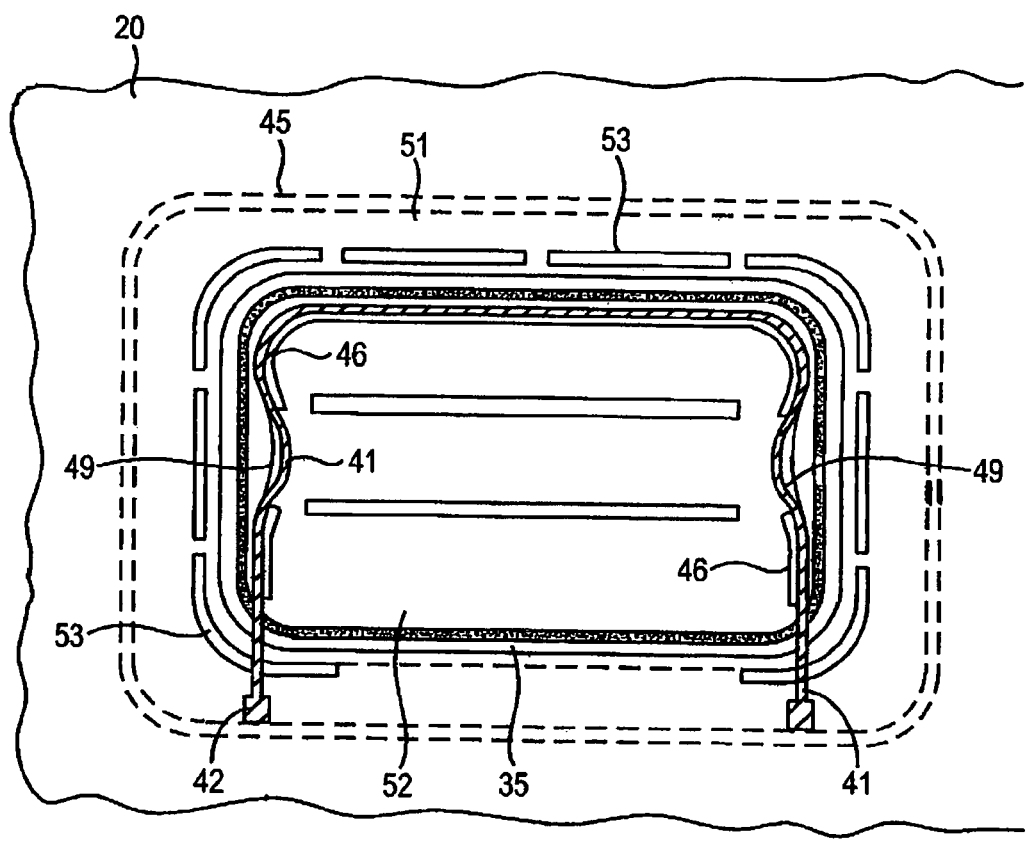
FIG. 3 is a plan view of the top side of the reaction plate/deployment chute installed in an instrument panel taken in the direction of arrow B in FIG. 2.

In FIG. 3 a molded thermoplastic airbag deployment chute/reaction plate 45 is shown in plan view from the outside of instrument panel with the skin 27, foam 28 and door substrate 14B removed, looking in the direction of arrow B in FIG. 2.

As shown in FIG. 2 and FIG. 3, the deployment chute/reaction plate 45 is comprised of a molded concave structure 51 that surrounds the airbag door opening as a reinforcing member and a deployment chute. The center section is a ribbed reaction plate 52 that shows to stiffen the back of the airbag door and to trap a tether inside. The deployment chute/reaction plate 45 is attached to the backside of the instrument panel 10B as shown in FIG. 2 by vibration welding, heat staking, mechanical attachment, adhesive or other methods known to those skilled in the art.

Turning back to FIG. 3, the instrument panel substrate 20 has a series of weakening apertures, in this case elongated slots 53 that partially outline the periphery of the airbag door opening and serve as weakening points for airbag deployment and fracture of the attached reaction plate 52/airbag door 14A. In addition, the molded deployment chute/reaction plate 45 has a series of apertures or an area of reduced cross-section at 35 to allow predictable separation of the reaction plate from the deployment chute. The tether for this door is shown at 41 and consists preferably of a metal cable or rod that essentially follows the path shown in FIG. 3 around a series of molded ribs 46 and 49. The path of the tether cable 41 or rod is purposely circuitous to create a controlled slack condition for the tether. Some of the ribs 46 are formed to be rigid and are attached from the reaction plate to the underside of the airbag door substrate 14B, so as to retain the tether 41 within the door structure. Other ribs 49 are purposely molded to be weaker (thinner) and to deform out of the way when the tether cable 41 is stressed and straightens out. Accordingly, those skilled in the art will appreciate that the ribs can be characterized with respect to their respective and relative stiffness, which can be quantitatively evaluated by flexural strength ($F_s$). The term $F_s$ is therefore a measure of the stress loaded upon the rib to cause bending and release of the tether. In addition, it should be appreciated herein that while in preferred embodiment ribs are employed in the reaction plate that have varying flexural strength values, all of the ribs may have the same $F_s$.

In addition, the stiffness can be adjusted by selectively attaching the ribs 49 and/or 46 to the reaction plate 52 and door 14B. In other words, should one attach rib 49 to both the reaction plate and door, one could reduce the stiffness requirement of rib 46, and vice versa. In this way, dynamic control of the resistance of the tether, upon air bag deployment, is achieved.

The ends of the tether cable 41 terminate with end features 42 at a point in the concave structure of the deployment chute 51 (as shown) or forward of the deployment chute/reaction plate molded structure 45B. The end features 42 prevent pulling through of the tether ends upon airbag deployment. Alternatively, the ends of the tether can be connected together to prevent pull-through. End features 42 may be molded, bolted, welded or formed on the end of the tether cable in any shape that will prevent travel of the ends of the tether cable from between the deployment chute and instrument panel attached surfaces.

Upon airbag deployment, the inflating airbag expands in the deployment chute 51B, (see FIG. 2) contacts the reaction plate 52B and fractures the weakened section 35B of the chute/plate 45B and the instrument panel substrate at 53A and skin at 16B causing the door/reaction plate to break loose from the panel 10B. The tether cable 41B is then pulled taut by the force of the door/reaction plate being moved out of the way of the bag 22 (not shown). As the tether cable 41B straightens out, it deflects the weaker ribs 49 (see FIG. 3) out of the way allowing the door to travel a controlled distance, usually 1–2 inches, and taking up any slack that was formed by the position of those ribs 49.

Figure 5B:
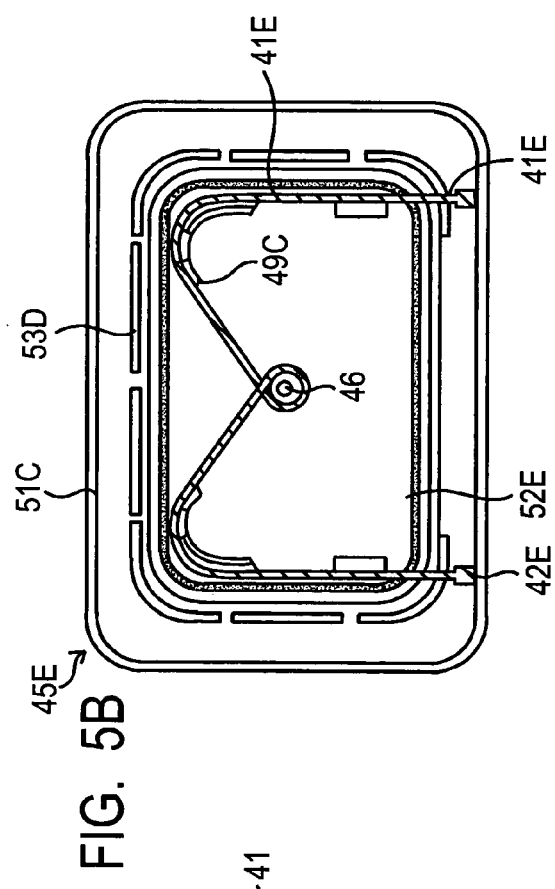
FIGS. 5A, 5B, 5C, 5D are alternate exemplary controlled slack patterns which may be used in practicing the invention.
Figure 5D:
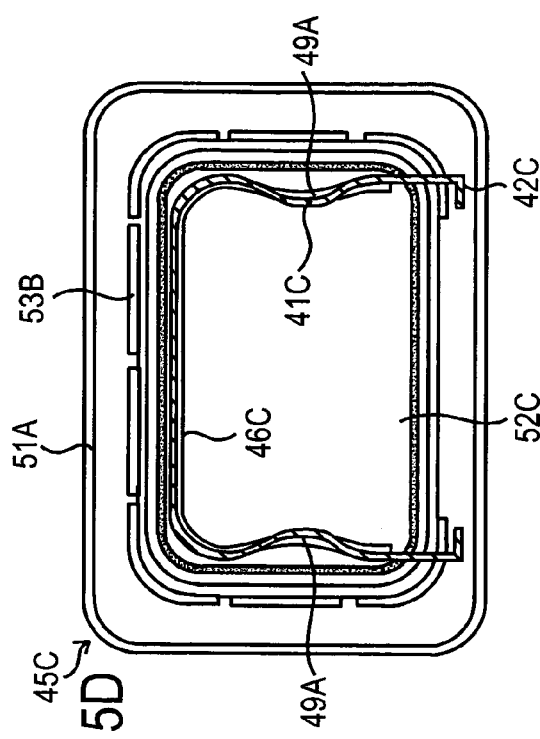

An alternate embodiment is shown in FIG. 5D using a pre-formed rod or wire of a similar size and shape to the tether cable 41. Again, end features 42C include a right angle bend, or the feature of connecting the rod ends together to prevent the tether from pulling loose. The rod is preferably contained by rigid ribs 46C but deflects the weaker ribs 49A as it straightens due to the stress of the airbag deploying, thereby taking up slack.

Figure 5A:
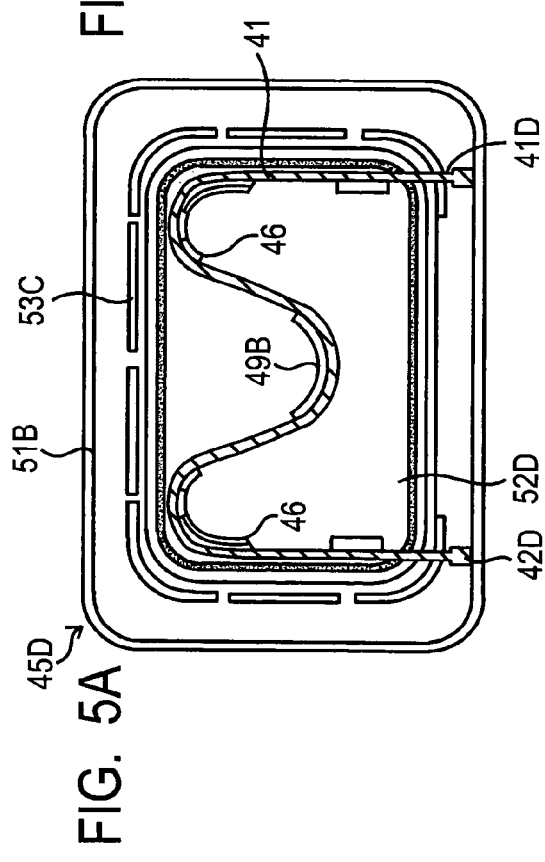
Figure 5C:
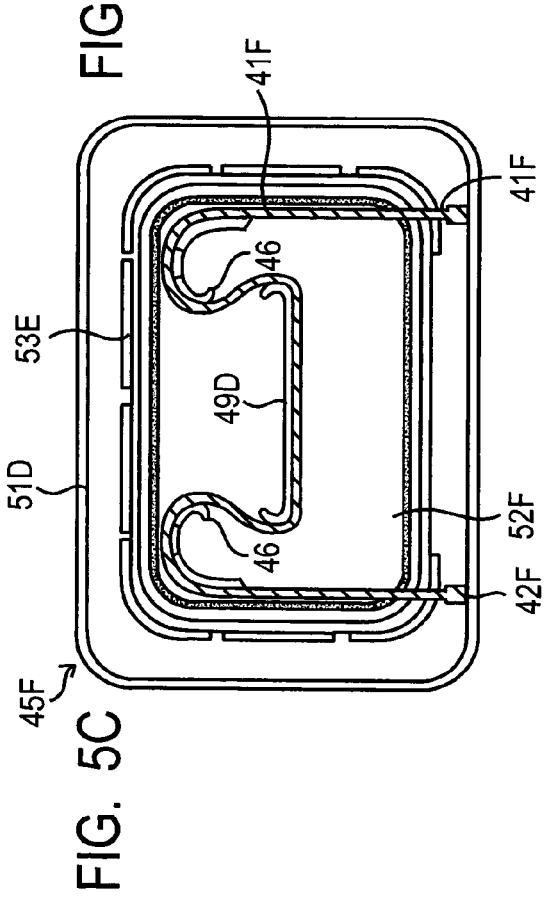

It can therefore now be appreciated that there are numerous controlled slack or loop designs that may be used to accomplish the objectives of the invention. FIGS. 5A–5C are exemplary but not inclusive of some of the loop designs that may be used to provide a dynamic and controlled slack tethering configuration for an airbag door, some allowing for greater movement of the door than others.

Alternatively, it is also possible to create the controlled slack in the deployment chute/instrument panel construction and have the tether ends firmly attached between the airbag door and reaction plate. In this embodiment (not shown), ribs may be formed within the concave structure of the deployment chute 51 which guide the path of the tether 41. Further, controlled slack mechanisms could be used in both locations.

Turning to FIG. 4, an instrument panel is shown that has been molded of thermoplastic resin having a cosmetic outer surface and a pre-weakened tear seam 16A formed in the underside of the panel 10A. The outer surface may have a texture or grain pattern formed as part of the molding process. A deployment chute 51A and reaction plate 52A have been molded separately and vibration welded to the underside of the instrument panel 10C. This example has a tether that functions as in FIG. 2, so that on airbag deployment the panel fractures at 16A, allowing the welded airbag door 14A/reaction plate 52A to break loose yet remain connected to the panel 10A by the tether 41A. The tether extends by deflecting over the weaker ribs but retains the door as the tether is trapped inside the door and held by ribs 46 (FIG. 3).

Figure 6:
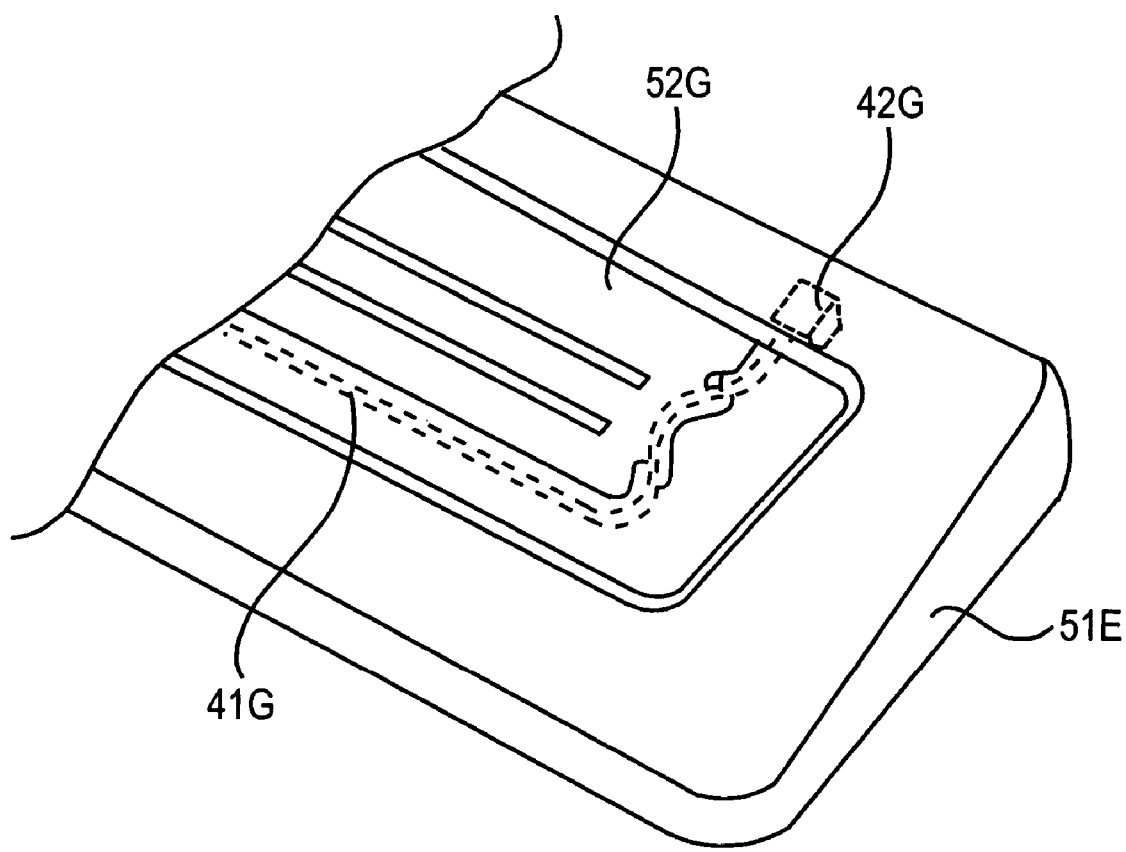
FIG. 6 is a perspective view of FIG. 3.

FIG. 6 shows a perspective view of the reaction plate 52G and deployment chute 51E ready to be vibration welded to an instrument panel (shown assembled in FIG. 4). In addition, it should be noted herein that with respect to all the various embodiments herein disclosed and illustrated it should be appreciated that the various options and preferred configurations may all be exchanged between each embodiment, as the case may be, to maximize the performance of the dynamic sliding tether configuration disclosed herein.

Thus, the tether construction disclosed herein when combined with a unitary molded deployment chute/door reaction plate provides a unique and reliable hinging and retention mechanism for an airbag door system, resulting in improved assembly and manufacturing. Alternately, the chute and reaction plate can be molded separately and attached individually to the instrument panel and contain the tether mechanism.

In addition, although not specifically illustrated, it can be appreciated herein that tether 41 may be selectively tacked together, at various points along its length, which tack stitching provides yet another technique for controlled tensioning upon airbag deployment. Specifically, the tacking may vary in strength, such that upon deployment and tensioning, the stitching at the tacked locations on the tether selectively releases to regulate and control the rate at which the airbag door is ultimately secured.

This description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically shown and described.

What is claimed is:

1. An airbag door construction for airbag deployment comprising:
   an instrument panel having an area defined at least partially by a tear seam that outlines at least a portion of an airbag door;
   a reaction plate and deployment chute, wherein the reaction plate is attached to the underside of said airbag door and said deployment chute is attached to said instrument panel, wherein at least one of said airbag door underside and said reaction plate contain first and second molded features, each such feature having a flexural strength $F_s$, wherein said first molded feature's $F_s$, is lower than said second molded feature's $F_s$;
   a tether that engages with said molded features in said reaction plate and with said deployment chute, whereupon airbag deployment said tether is not retained by said first molded feature but is retained by said second molded feature.

2. The one of said airbag door and reaction plate of claim 1 comprising a plurality of said first and second molded features in the one of said air bag door and reaction plate.

3. The one of said airbag door and reaction plate of claim 1 wherein the first and second molded features define a path of said tether in the one of said airbag door and reaction plate.

4. The first and second molded features of claim 1 wherein the molded features comprise raised ribs.

5. The tether of claim 1 wherein said tether comprises a cable.

6. The tether of claim 1 wherein said tether comprises a rod.

7. The tether of claim 1 wherein said tether comprises a wire.

8. The tether of claim 1 wherein said tether comprises fibers.

9. The tether of claim 1 wherein said tether comprises a woven fabric.

10. The tether of claim 1 wherein the tether includes ends that are secured within said instrument panel.

11. The instrument panel of claim 1 wherein said panel is molded of thermoplastic.

12. The instrument panel of claim 1 wherein said panel is covered with one of a flexible skin and a flexible skin backed with foam.

13. The tether of claim 1 wherein the tether has a length and wherein said tether is tacked together at a point along its length.

14. The tether of claim 13, wherein said tether is tacked together at a plurality of locations along its length.

* * * * *